UNITED STATES PATENT OFFICE.

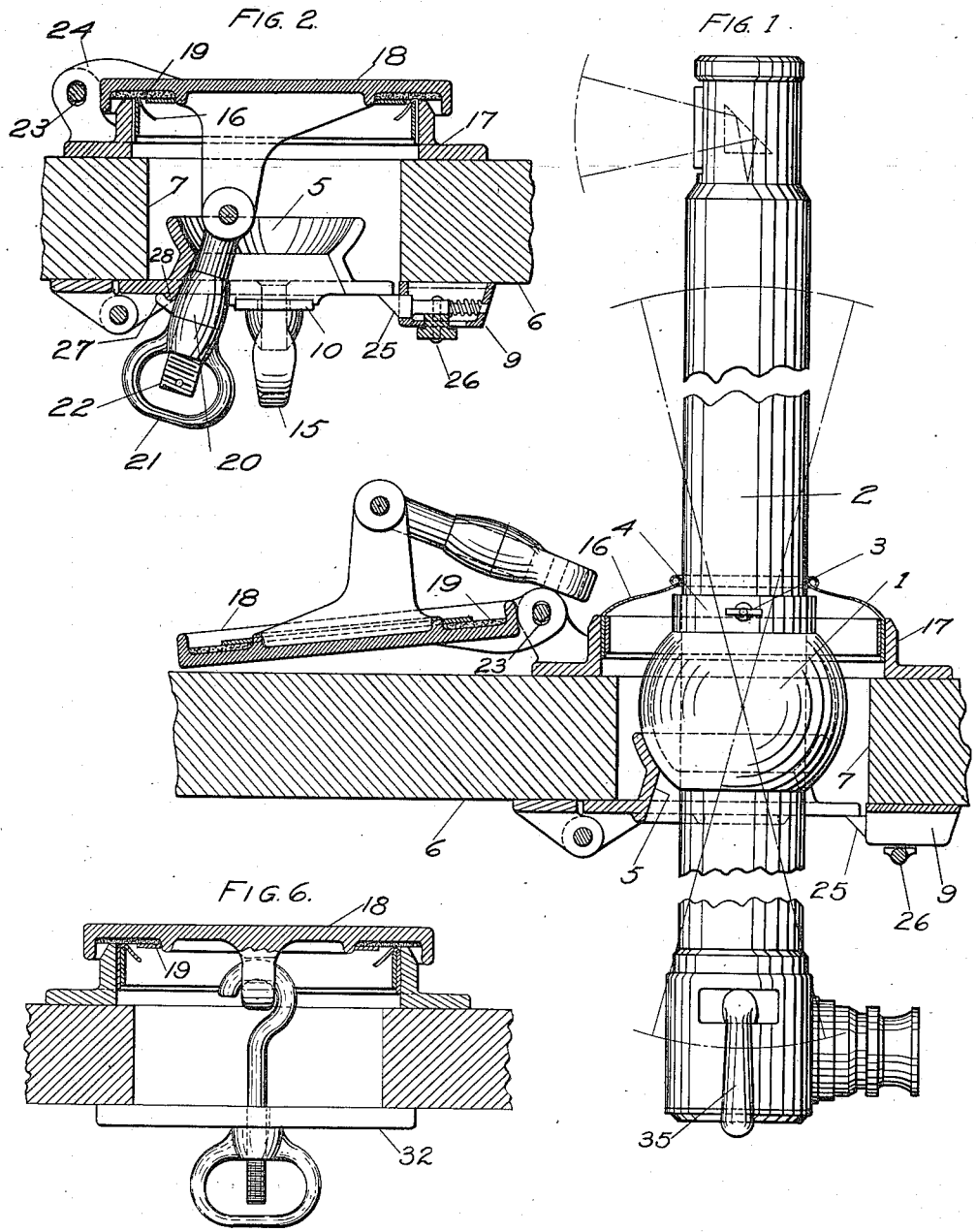

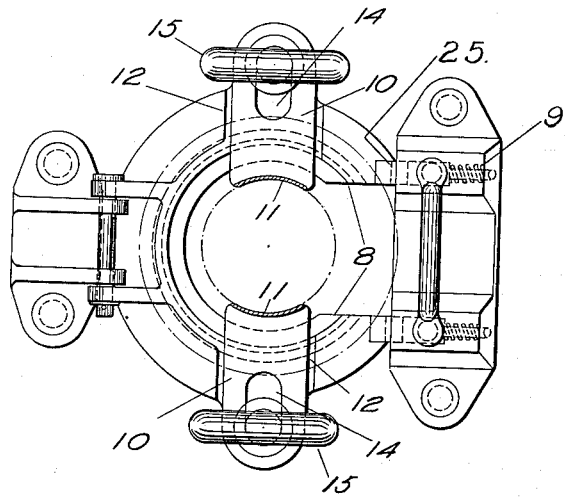
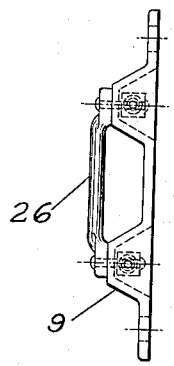
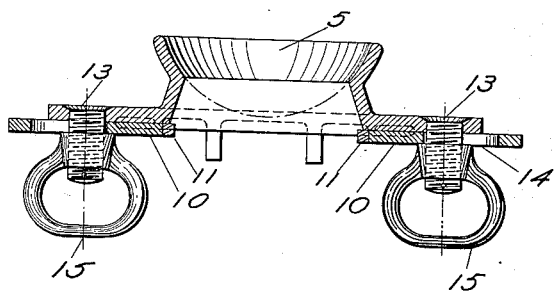
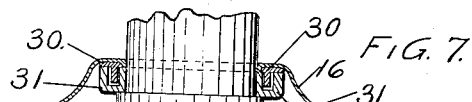
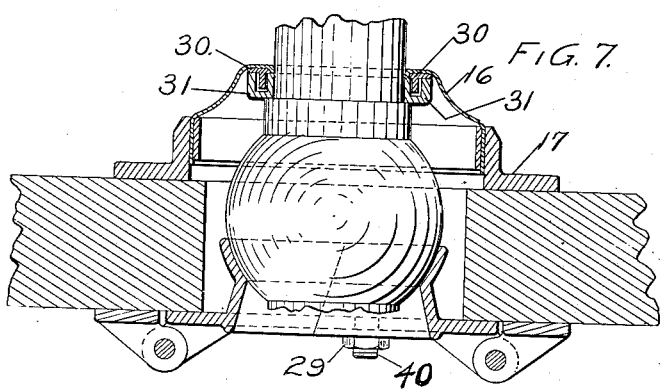
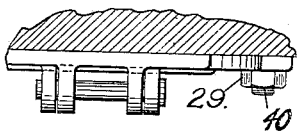

HARRY H. STYLL, OF SOUTHBRIDGE, MASSACHUSETTS.

OBSERVATION-GLASS.

1,161,995.  Specification of Letters Patent.  Patented Nov. 30, 1915.

Application filed June 15, 1910. Serial No. 567,112.

*To all whom it may concern:*

Be it known that I, HARRY H. STYLL, a citizen of the United States, and a resident of Southbridge, in the county of Worcester and State of Massachusetts, have invented certain new and useful Improvements in Observation-Glasses, of which the following is a specification.

My invention relates to improvements in observation glasses for taking observations from behind a screen or barrier and consists in providing means for mounting an optical instrument on the barrier whereby said instrument may be universally adjustable.

The objects of my improvements are: First, to provide a bearing allowing observations to be made in all directions; second, to provide means for seating and unseating the instrument in the bearings; third, to provide means to lock the instrument in any desired position; fourth, to prevent water from entering the opening in the barrier when the instrument is in use; fifth, to cover the opening in the barrier and to lock the cover in place when the instrument is removed from the opening in the barrier.

I attain these objects by the construction illustrated in the accompanying drawings, showing a preferred form of my invention in which a ball on the tube of an optical instrument operates in conjunction with a socket member on a barrier, and in which:

Figure 1,—represents a sectional elevation through the opening in the barrier—instrument in operative position. Fig. 2,—represents a sectional elevation through the opening in the barrier,—instrument removed, cover over opening closed. Fig. 3,—represents a bottom or plan view of the bearing socket inverted. Fig. 4,—represents a transverse section through the bearing socket, and locking plates. Fig. 5,—represents an elevation of the lock for securing the bearing socket, releasing handle shown. Fig. 6,—represents modifications of cover and clamp. Figs. 7 and 8 represent modifications of socket and flexible cover.

Similar numerals refer to similar parts throughout the several views.

Referring to the drawings, a hollow segmental ball —1— is applied to the tube 2 of an optical instrument. This ball may be integrally fixed on the tube or it may be slidably connected therewith, being secured in position by a set screw —3— in the collar —4— of the ball.

A hollow socket —5—, the bearing surfaces of which are concentric with the curvature of the ball —1— and register therewith is hinged or otherwise connected to the barrier —6— adjacent to the opening —7. The walls of the socket 5 are cut out, divided, or made separable as at 8— Fig. 3, to allow the instrument tube to be inserted into its operative position with reference to said socket. The socket 5 is held in position with respect to the barrier, or released therefrom by a movable catch 9, which is provided with spring noses 25, projecting under the edges of the socket 5. The noses may be pushed back to release the socket by the cross bar or handle 26, connecting them.

Locking plates 10, the inner edges 11 of which are concentric with the instrument tube and knurled or otherwise treated so as to provide a non-slipping contact with said tube, are arranged to move laterally in guides on the socket 5. This movement of the locking plates is controlled by the studs 13 set in the socket and projecting through slots 14 in the locking plates. Wing nuts 15 on the studs 13 secure the locking plates in place.

Water is prevented from entering the opening 7 in the barrier, when the instrument is in operative position therein, by the flexible cover 16, the center of which is cut out so as to make elastic frictional engagement with the tube 2 of the instrument, while the outer edge is secured to a coaming 17 surrounding the opening in the barrier.

When the instrument is removed from its operative position upon the barrier, the opening 7, in said barrier 6, is closed by a cover 18, which is provided with a strip of yielding material 19 adapted to bear on the coaming 17 surrounding the opening in the barrier when the cover is closed. This cover is held in close contact with coaming 17 by a clamp 20, a finger —27— on which engages a projection 28 on the socket 5, said clamp, which operates on a threaded member 22, connected with the cover, is maintained against said socket by a wing nut 21. An elongated hole 23 in the male portion of the cover hinge 24, if a hinge is used, permits the compression of the yielding strip 19 on the coaming 17.

The operation is as follows: When the opening in the barrier is closed as shown in Fig. 2, the instrument is stowed conveniently near the opening 7. To open the cover 18, the wing nut 21 is unscrewed slightly from the threaded member 22, the clamp 20 slipped down out of engagement with the socket 5, the threaded member 22 swinging into a vertical position and the cover 18 pushed upwardly and backwardly until it assumes the position on top of the barrier indicated in Fig. 1. The catch 9 is next retracted until socket 5 is released; said socket will then drop downwardly and clear of the barrier opening. The instrument is next inserted in the opening 7 and pushed up through the flexible cover 16, the lower edge of the ball 1, being held at a higher level than the top edge of socket 5 when the socket is in operative position. Socket 5 is then swung up, the instrument case being passed through the divided portion of the socket as at 8. The catch 9 engages the socket when it reaches its operative position and secures it therein. The ball 1 is next seated on the bearing surfaces of the socket. Observations with the instrument may now be taken, those in a horizontal plane by rotating the ball 1 in its bearing socket 5 about the vertical axis of the instrument, and those in elevation and depression by rotations about any horizontal axis of the instrument. Horizontal observations can be obtained at any point within three hundred and sixty degrees. Those in elevation and depression are restricted according to the structure adopted at the opening 7.

The flexible cover 16 is capable of adjusting itself to the movements of the tube 2 of the instrument. If it is desired to retain the instrument in any fixed vertical position, the wing nuts 15 are loosened, the locking plates 10 are pushed in until the knurled edges 11 thereon engage tube 2 of the instrument, and the wing nuts 15 retightened.

To remove the instrument from the opening in the barrier, the operation is the reverse of that described above. The locking plates 10, if they have been engaged with the tube 2 of the instrument should be released and pushed back, the socket 5 released by the catch 9 and swung down; the instrument removed from the opening 7 and the flexible cover 16 and the socket 5 swung back to its horizontal position. The cover 18 is next pulled down on the coaming 17 by the threaded member 22. The clamp 20 is slipped into engagement with the socket 5 and the wing nut 21 tightened up against clamp 20, thereby drawing the yielding strip 19 on the cover into compressed contact with the coaming 17 around the opening in the barrier.

The observation instrument rests on its bearing surfaces by its own weight, being retained there by the operator by means of the handles 35. When desired to secure the instrument in any one position the locking plates 10 are brought into use as described above. The bearing is designed to act as a steady rest for the operator.

Various changes can be made in the details of construction without departing from the spirit of my invention.

The cover 18 may be pivoted, or not, as desired, see Figs. 1 and 6. The clamp 20 could engage an independent bridge member 32, across the opening of the barrier instead of the socket 5 as shown, see Fig. 6. The clamp 20 could engage the cover by the threaded member, 22, being connected to a cross member spanning the opening in the barrier instead of the reverse as shown, see Fig. 6. The socket bearing may be separated and pivoted on each side and held in place by a stud 40, and a nut 29, connecting a flange on the side of the socket to the barrier instead of on one side as shown, in order to allow the instrument to be inserted in the opening of the barrier, see Figs. 7 and 8. The flexible cover 16, can be attached to a floating ring 30, bearing on a collar 31, on the instrument tube as in Fig. 7. Therefore, in view of the above modifications, I do not desire to be strictly limited to the details shown.

I am aware that prior to my invention, observation instruments have been made with a projecting tube fitted with optical lenses and prisms. I, therefore, do not claim such a combination broadly, but

What I claim as new and desire to cover by Letters Patent is:

1. In a device for taking observation from behind barriers, the combination of a barrier, a sighting instrument projecting through the barrier and mounted for movement relative thereto, a yielding cover secured to the barrier and surrounding the sighting instrument, and interlocking members carried by the instrument and the cover for making a tight joint therebetween.

2. In a device for taking observations, the combination of a sighting instrument having an objective and an eye piece and an adjustable ball shape bearing surface secured intermediate of its ends adapted to have universal engagement with a supporting surface.

3. In a device for taking observations, the combination of a sighting instrument having an objective and an eye piece, universal oscillating bearing means intermediate of its ends, a support and operative means for releasing the instrument from its supported position.

4. In a device for taking observations from behind barriers, the combination of a barrier, a sighting instrument projecting through said barrier, a ball bearing fixed intermediate of the ends of said instrument and supporting the same, a socket adapted to have universal engagement with said ball and adjustably related with an opening in the barrier, and means to secure the socket in position.

5. In a device for taking observations from behind barriers, the combination of a barrier, a sighting instrument projecting through said barrier, a ball adjustable as to said instrument, a socket bearing adjustably related to said barrier, and means for securing the socket in position.

6. In a device for taking observations from behind barriers, the combination of a barrier, a sighting instrument projecting through said barrier, a universal joint uniting said instrument and barrier, and means for locking said instrument in fixed position.

7. In a device for taking observations from behind barriers, the combination of a barrier, a sighting instrument projecting through said barrier, a separable ball and socket joint uniting said instrument and barrier, and means for locking said instrument in fixed position.

8. In a device for taking observations from behind barriers, the combination of a sighting instrument, a ball adjustable on said instrument and means for securing the ball in position.

9. In a device for taking observations from behind barriers, the combination of a barrier with an opening, a sighting instrument projecting through said opening, and a yielding cover adapted to close the space between said instrument and opening.

10. In a device for taking observations from behind barriers, the combination of a barrier with an opening, a sighting instrument projecting through said opening and a yielding cover operatively contacting with the instrument and secured adjacent to the edges of said opening, and adapted to close between said instrument and barrier.

11. In a device for taking observations from behind barriers, the combination of a barrier with an opening adapted to receive a sighting instrument, of a yielding cover surrounding the instrument and having its outer portion secured to the barrier adjacent the opening therein, a flanged collar carried by the instrument and having a portion extending peripherally of and spaced from the instrument, and a bearing portion carried by the cover and adapted to fit between the instrument and the peripheral flange thereon for insuring a tight joint between the instrument and yielding cover.

12. In a device for taking observations from behind barriers, the combination of a socket having divided contact members, a sighting instrument having a ball inserted between said contact members, and means for holding the contact members in contact position.

13. In a device for taking observations from behind barriers, the combination of a socket having separating contact members, a sighting instrument having a ball inserted between said contact members, and means of holding the contact members in contact position.

14. In a device for taking observations from behind barriers, the combination of a sighting instrument adapted to project through an opening in the barrier and provided with a ball, a socket bearing, locking plates adapted to engage the instrument and means for securing the locking plates in position.

15. In a device for taking observations from behind barriers, the combination of a barrier having an opening adapted to receive a sighting instrument, of an instrument mounted in the opening and having a ball bearing mounted thereon, a socket detachably engaging the said ball bearing, and means for automatically engaging and holding the socket in operative position relative to the ball bearing.

16. In a device for taking observations from behind barriers, the combination of a barrier, a sighting instrument projecting through said barrier, a ball and socket joint uniting instrument and barrier, means for throwing the socket in or out of contact with the ball, and means for holding the socket in contact position.

17. In a device for taking observations from behind barriers, the combination of a barrier, a sighting instrument projecting through said barrier, a ball and socket joint uniting instrument and barrier, means for throwing the socket in or out of contact with the ball, means for holding the socket in contact position, and means for locking the instrument in fixed position.

18. In a device for taking observations from behind barriers, the combination of a sighting instrument having a ball, a socket having divided contacting members adapted to admit said instrument between them, means to hold said members in contact position, and means to release said members.

19. In a device for taking observations from behind barriers, the combination of a sighting instrument having a ball bearing mounted thereon, of a barrier having an opening therein to receive the instrument, a socket pivotally secured to the barrier and adapted to be moved to engage the ball bearing, and spring actuated means for engaging and securing the socket in operative position.

20. In a device for taking observations from behind barriers, the combination of a barrier having an opening, a sighting instrument in said opening, a separable universal joint uniting said instrument and barrier, and a yielding cover adapted to close the space between said instrument and barrier.

21. A device for taking observations from behind barriers comprising a sighting instrument provided with a reflecting surface at its outer end and a ball bearing upon said sighting instrument intermediate of its ends, a socket adapted to have universal engagement with said ball and to adjustably cooperate with an opening in the barrier, and a yielding cover adapted to engage the sighting instrument and to be fixed to the edges of the barrier opening.

22. In a device for taking observations from behind barriers, the combination with a barrier having an opening formed therein, of a sighting instrument mounted in the opening and provided with a ball bearing, a socket carried by the barrier for detachably engaging the ball bearing on the instrument, and manually operable means for securing the socket in engagement with the ball bearing on the instrument.

23. In a device for taking observations from behind barriers, the combination of a sighting instrument provided with a reflecting surface at its outer end and a bearing collar intermediate of the ends of said instrument, of a yielding cover adapted to close the space between said instrument and the opening therefor in the barrier, said cover being provided with a bearing ring adapted to movably contact with the collar.

24. In a device for taking observations from behind barriers, the combination with a barrier having an aperture formed therein, of a sighting instrument projecting through the aperture in the barrier and having a bearing portion formed thereon, a socket carried by the barrier for detachably engaging the bearing on the instrument, spring actuated means for automatically locking the socket in operative position as the same is moved into said position, and means for manually releasing the socket to permit of disengagement of the socket and bearing.

25. The combination with a barrier having an aperture formed therein, of a sighting instrument mounted in the aperture and having a bearing portion thereon, a socket carried by the barrier and having a pair of furcations adapted to extend on opposite sides of the instrument and engage the bearing on the instrument to pivotally mount the said instrument, and means carried by the barrier for engaging the free ends of the furcations to secure the socket and thus the instrument supported thereby in operative position.

26. The combination with a barrier having an aperture formed therein, of a sighting instrument projecting through the aperture and having a bearing portion formed thereon, a socket pivoted to the barrier and having furcations adapted to extend on opposite sides of the instrument and project therebeyond to the other side of the aperture from that to which the socket is secured, means for locking the free ends of the furcations in engagement with the barrier to retain the socket in place, and locking members carried by the socket and adjustable relative thereto for locking the instrument in fixed position relative to the socket.

27. An instrument of the character described embodying a body portion having an eye piece, a bearing on the body portion adapted to support the instrument, and permit universal movement thereof, said bearing being adjustable along the body portion, and handles carried by the body portion and so disposed relative to the eye piece as to permit of ready grasping of the handles by the person looking into the eye piece to facilitate shifting of the instrument by said person.

28. An observation periscope including a body portion having an objective at one end thereof, and an eye piece at the opposite end, a bearing mounted and longitudinally slidable upon the body portion of the periscope, and means for securing the bearing in desired adjusted position on the said body portion.

29. As an article of manufacture, a portable sighting instrument comprising a body portion having an objective at one end and an eye piece at the other end, and a truncated sphere longitudinally adjustable on the body portion intermediate its ends.

30. In a device for taking observations from behind barriers, the combination of a sighting instrument, bearings allowing rotative and oscillatory movements of the instrument therein, and means for securing the instrument at desired angular positions therein, said instrument being also slidable in the bearings.

31. In a device for taking observations from behind barriers, the combination of a barrier, a sighting instrument projecting through said barrier, a ball adjustable as to said instrument, a socket bearing adjustably related to said barrier, and a latch for securing the socket in position.

32. In a device for taking observations from behind barriers, the combination of a barrier, a sighting instrument projecting through the barrier, bearing means intermediate of its ends, a support hinged to the barrier and adapted to be swung into position to support the instrument, and means for securing the support in its raised position.

33. In a device for taking observations from behind barriers, the combination of a barrier, a sighting instrument projecting through the barrier, bearing means intermediate of its ends, a divided support hinged to the barrier and adapted to be swung into position to support the instrument, and means for securing the support in its raised position.

In testimony whereof, I affix my signature in the presence of two witnesses.

HARRY H. STYLL.

Witnesses:
 CHARLES I. KING,
 O. B. CARSON.